United States Patent Office 3,371,084
Patented Feb. 27, 1968

3,371,084
PROCESS FOR PREPARING HALOGEN-
SUBSTITUTED-1,4-BENZODIAZEPINES
Rodney Ian Fryer, North Caldwell, Edward E. Garcia, West Caldwell, and Leo Henryk Sternbach, Upper Montclair, N.J., assignors to Hoffmann-La Roche Inc., Nutley, N.J., a corporation of New Jersey
No Drawing. Filed Dec. 9, 1965, Ser. No. 512,795
8 Claims. (Cl. 260—239.3)

ABSTRACT OF THE DISCLOSURE

A process for preparing 3-halo-1,4 - benzodiazepin - 2- ones from 3-unsubstituted-1,4-benzodiazepin - 2 - ones by reacting said 3-unsubstituted compounds with a halogenating agent containing

halo group. The 3-halo-1,4 - benzodiazepin - 2 - ones are valuable intermediates for producing medicinally valuable known 1,4-benzodiazepin-2-ones having either a lower alkoxy, a lower acyloxy, or an amino group substituted on the 3-position.

---

The present invention relates to novel chemical processes. More particularly, the present invention relates to novel chemical processes for preparing 3-halo-1,4-benzodiazepin-2-ones utilizing a novel system comprising a free radical catalyst. Such 3-halo-benzodiazepines are useful as intermediates in the preparation of compounds which have been found to be interesting from a pharmacological point of view.

More particularly, the present invention in one aspect relates to a novel process for preparing compounds which can be characterized broadly in a chemical sense as being 3-halo-1,4-benzodiazepin-2-ones. Furthermore, the invention in another of its aspects is concerned with a novel process for preparing certain end products utilizing the aforementioned 3-halo compounds known prior to the present invention as being medicinal agents by virtue of their pharmacological activity.

The aforementioned 3-halo-1,4-benzodiazepines are of the formula

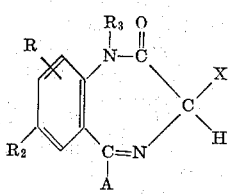

wherein A is selected from the group consisting of

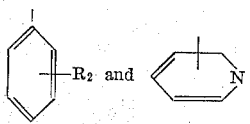

R and $R_1$ are each selected from the group consisting of hydrogen, halogen, nitro, trifluoromethyl and lower alkyl; $R_2$ is selected from the group consisting of hydrogen and halogen; $R_3$ is selected from the group consisting of hydrogen and lower alkyl and X is halogen, preferentially selected from the group consisting of bromine, chlorine and iodine.

Such compounds of Formula I above can be prepared by reacting a compound of the formula

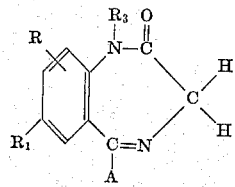

wherein A, R, $R_1$ and $R_3$ are as above with a halogenating agent containing a

group wherein X is as above. Preferred among the many halogenating agents which contain a

group and hence are employable in the process aspect of the invention disclosed herein are those selected from the group consisting of a compound of the formula

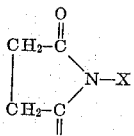

a compound of the formula $$\text{lower alkyl}-\overset{O}{\underset{}{C}}-\overset{H}{\underset{}{N}}-X \qquad \text{IIIb}$$

and; a compound of the formula

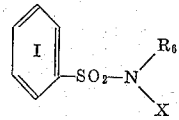

wherein X is as above, I connotes unsubstitution or substitution and $R_6$ is selected from the group consisting of hydrogen and lower alkyl. When I connotes substitution, a lower alkyl group is preferred.

Illustrative of compounds within the genus encompassed by Formulas IIIa, IIIb and IIIc above are N-chlorosuccinimide, N-bromosuccinimide, N-halo-lower alkanoyl amides, e.g., N-chloroacetamides, N-chloro sulfonamides such as chloramine-B, chloroamine-T and the like.

Any suitable free radical catalyst which is capable of effecting the conversion of compounds of Formula I above is included within the purview of the present invention. Illustrative of suitable catalysts are azo-bis-lower alkyl nitriles such as azobisisobutyronitrile, di-lower alkyl peroxides such as di-t-butylperoxides, di-acyl peroxides such as di-lower alkanoyl peroxides (e.g., acetyl peroxide) per esters such as, t-butylperbenzoate and t-butyl perphthalate, hydroperoxides such as t-butyl hydroperoxide and cumene hydroperoxide and the like. Preferred among the many free radical catalysts is azodiisobutyronitrile.

In an advantageous aspect of the present invention, the above reaction is effected utilizing an inert organic solvent as the reaction medium. Representative of inert organic solvents which may be efficaciously employed in this process aspect of the present invention are aromatic hydrocarbons such as benzene, xylene, toluene and the like; chlorinated hydrocarbons such as chlorobenzene, carbon tetrachloride and the like. Temperature and pressure are not critical features of the above reaction and thus, this step can be effected at room temperature and atmospheric pressure or above room temperature. It should be readily apparent to those skilled in the art that the temperature at which the conversion of compounds of Formula II above to compounds of Formula I above is run, is determined, in part, by the free radical catalyst employed. It is well known that some radical formation, which is caused by bond dissociation, occurs at room temperature. Thus, with a catalyst which dissociates at room temperature, the reaction may be conducted at such a temperature. Most free radical catalysts, however, dissociate at above room temperature. Thus, it is preferred to conduct the said first stage at elevated temperatures, advantageously, at about the reflux temperature of the reaction medium.

As is noted above, the invention in one of its aspects relates to the preparation of valuable compounds known prior to the invention. Such compounds are of the formula

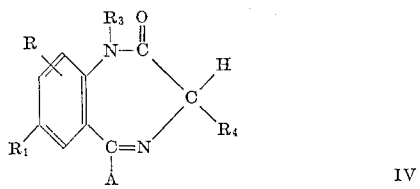

IV wherein A, R, $R_1$, and $R_3$ are as above and $R_4$ is selected from the group consisting of lower alkoxy, acyloxy and amino.

The sequence of steps from compounds of Formula II above to compounds of Formula IV above via compounds of Formula I above is included within the purview of the present invention and, broadly stated, involves treating a compound of the Formula I above with a conversion means selected from the group consisting of ammonia and a compound having the formula $$MOR_5 \quad \quad V$$

wherein M is selected from the group consisting of hydrogen, alkali metals and alkaline earth metals and $R_5$ is selected from the group consisting of lower alkyl and acyl.

In Formula IV above, A is advantageously phenyl or α-pyridyl. More particularly, one of the embodiments embraced by the novel process aspects of the invention provides a method for preparing a compound corresponding to Formula IV above wherein $R_4$ is lower alkoxy starting with the corresponding compound of Formula II above. This preparation is effected by first reacting a compound of Formula II above with a compound of the Formula IIIa above, or the Formula IIIb or the Formula IIIc above, in the presence of a free radical catalyst as described more particularly hereinabove whereby to obtain the corresponding compound of the Formula I above and thereafter treating the latter, preferentially, without isolating the same from the reaction medium in which it is prepared, with a compound having the Formula V above ($MOR_5$) wherein M is hydrogen and $R_5$ is lower alkyl, e.g., a lower alkanol such as ethanol, propanol and the like.

Compounds corresponding to Formula IV above wherein $R_4$ is acyloxy also can be prepared sequentially by first treating a compound of the Formula II above with a compound of Formula IIIa above or of the Formula IIIb above or of the Formula IIIc above in the presence of a free radical catalyst whereby to obtain the corresponding compound of the Formula I above and treating the so-obtained product, preferentially, without isolating the latter, with a compound of the Formula V above ($MOR_5$) wherein M is as above and $R_5$ is acyl. In a preferred embodiment, M is an alkali metal, e.g., sodium and $R_5$ is a lower alkanoyl group, e.g. acetyl. The compound, so prepared, i.e., compounds of Formula IV above wherein $R_4$ is acyloxy, can be hydrolized employing any convenient hydrolizing technique such as treatment with a base in a solvent, e.g., a methanolic solution of sodium hydroxide, to thereby form a compound corresponding to Formula IV above which bears the hydroxy radical in position-3, rather than the $R_4$ group ascribed thereto hereinabove.

Compounds of Formula IV above wherein $R_4$ is amino can be prepared by treating a compound of the Formula I above with ammonia in the presence of an inert organic solvent such as dichloromethane. The so-obtained 3-amino compounds, as with the 3-acyl compounds, can be converted, if desired, to the 3-hydroxy compound mentioned hereinabove by techniques described in the literature.

The foregoing is a general description of the main synthetic routes for the preparation of compounds of the Formula I and IV above. It will be readily apparent to one skilled in the art that variations in these procedures are possible.

The following examples are illustrative but not limitative of the present invention. All temperatures are in degrees centigrade.

EXAMPLE 1

A solution of 5.4 g. (0.02 mole) of 7-chloro-1,3-dihydro-5-phenyl-2H-1,4-benzodiazepin-2-one, 3 g. (0.022 mole) of N-chloro-succinimide, 0.1 g. of azodiisobutyronitrile and 200 ml. of benzene was refluxed for 1 hr. The resultant suspension was concentrated to dryness and the residue which contained 3,7-dichloro-1,3-dihydro-5-phenyl-2H-1,4-benzodiazepin-2-one was heated on the steam bath for 10 min. with 100 ml. of glacial acetic acid and 2.5 g. of sodium acetate. The acetic acid was removed in vacuo and the residue partitioned between chloroform-water. The chloroform was washed (3×200 ml. of water), dried over sodium sulfate and concentrated to dryness. Addition of ether and refrigeration yielded pale-brown crystals of 3-acetoxy-7-chloro-1,3-dihydro-5-phenyl-2H-1,4-benzodiazepin - 2 - one, melting point 227–231° (35%). Recrystallization from ethanol-water gave the product as white crystals, melting point 237–240°.

EXAMPLE 2

A solution of 5.4 g. (0.02 mole) of 7-chloro-1,3-dihydro-5-phenyl-2H-1,4-benzodiazepin-2-one, 3 g. (0.022 mole) of N-chloro-succinimide, 0.1 g. of azodiisobutyronitrile and 200 ml. of benzene was refluxed for 1 hour. The resultant suspension was concentrated to dryness and the residue which contained 3,7-dichloro-1,3-dihydro-5-phenyl-2H-1,4-benzodiazepine-2-one was suspended in 50 ml. of dichloromethane. The resultant suspension was added with stirring to 100 ml. of dichloromethane saturated with ammonia. The mixture was stirred for 1 hour in an ice-bath and for 3 hours at room temperature. The dichloromethane was removed in vacuo leaving an oily residue. The oily residue was covered with 35 ml. of acetonitrile and heated to reflux. After filtration, the acetonitrile filtrate so-obtained was concentrated to dryness. Fractional recrystallization of the residue from ethanol gave 3-amino-7-chloro-1,3-dihydro - 5 - phenyl - 2H - 1,4-benzodiazepin-2-one as a red-brown solid, melting point 187–192° (dec.). Recrystallization from acetonitrile gave the product as pale-brown crystals, melting point 218–220° (dec.).

EXAMPLE 3

A solution of 4 g. (0.01 mole) of 7,9-dibromo-1,3-dihydro-5-(2-pyridyl)-2H-1,4-benzodiazepin-2 - one, 1.5 g. (0.011 mole) of N-chlorosuccinimide and 0.1 g. of azodiisobutyronitrile in 200 ml. of benzene was refluxed for 1.5 hours. The benzene was removed in vacuo and the residue which contained 3-chloro-7,9 - dibromo - 1,3 - dihydro-5-(2-pyridyl)-2H - 1,4 - benzodiazepin - 2 - one was heated on the steam bath for 20 minutes with 60 ml. of acetic acid and 2 g. of sodium acetate. The acetic acid was removed at reduced pressure and the residue partitioned between chloroform-water. The chloroform extract was washed, dried and concentrated to dryness. The residue was recrystallized several times from benzene to yield 3-acetoxy-7,9-dibromo-1,3-dihydro-5 - (2 - pyridyl) - 2H-1,4-benzodiazepin-2-one as white needles, melting point 215–218° (dec.).

EXAMPLE 4

A solution of 10.8 g. (0.04 mole) of 7-chloro-1,3-dihydro-5-phenyl-2H-1,4-benzodiazepin-2-one in 400 ml. of hot benzene was treated with 6 g. (0.044 mole) of N-chlorosuccinimide, 0.2 g. of azodiisobutyronitrile and refluxed for 1 hour. After cooling to room temperature, the mixture was filtered. The benzene filtrate was concentrated to a brown oil which contained 3,7-chloro-1,3-dihydro-5-phenyl-2H-1,4-benzodiazepin-2-one. The brown oil was added to 80 ml. of ethanol and the resultant suspension heated on the steam bath for 10 minutes. After concentrating this mixture to dryness, the residue was partitioned between 300 ml. of ether and 200 ml. of water. The solid suspended in these layers was filtered, washed with ether and recrystallized once from acetonitrile-water (4/1) and finally from 10 ml. of acetonitrile to yield 7-chloro-1,3-dihydro-3-ethoxy-5 - phenyl - 2H - 1,4-benzodiazepin-2-one, melting point 225–227°.

We claim:

1. A process for the preparation of a compound of the formula

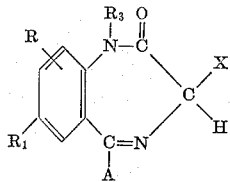

I wherein A is selected from the group consisting of

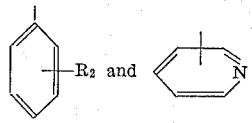

R and $R_1$ are selected from the group consisting of hydrogen, halogen, trifluoromethyl, nitro and lower alkyl; $R_2$ is selected from the group consisting of hydrogen and halogen; $R_3$ is selected from the group consisting of hydrogen and lower alkyl and X is selected from the group consisting of chlorine, bromine and iodine which comprises reacting a compound of the formula

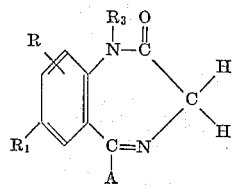

II wherein A, R, $R_1$ and $R_3$ are as above with a compound halogenating agent selected from the group consisting of a compound of the formula:

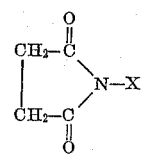

a compound of the formula:

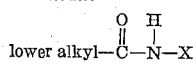

and; a compound of the formula:

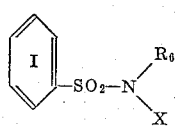

wherein X is as above and I connotes unsubstitution or substitution; and $R_6$ is selected from the group consisting of hydrogen and lower alkyl.

2. The process of claim 1 wherein said reaction is carried out in an inert organic solvent in the presence of a free radical catalyst selected from the group consisting of azo-bis-lower alkyl nitriles, di-lower alkyl peroxides, diacyl peroxides, peresters and hydroperoxides.

3. The process of claim 1 wherein said reaction is carried out in an inert organic solvent in the presence of a free radical catalyst selected from the group consisting of azo-bis-lower alkyl nitriles, di-lower alkyl peroxides, diacyl peroxides, peresters and hydroperoxides.

4. A process as defined in claim 2 wherein A is the

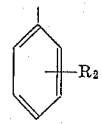

group, R and $R_2$ are both hydrogen and $R_1$ is halogen.

5. A process as defined is claim 4 wherein the halogenating agent utilized is of the formula

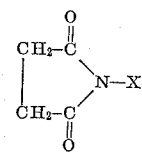

6. A process as defined in claim 1 which includes the additional step of converting a compound of the Formula I with a conversion means selected from the group consisting of ammonia and a compound of the formula

MOR₅    IV wherein M is selected from the group consisting of hydrogen, an alkali metal and an alkaline earth metal and $R_5$ is selected from the group consisting of lower alkyl and acyloxy to thereby obtain a compound of the formula

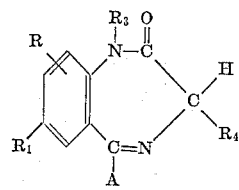

V wherein A, R, $R_1$ and $R_3$ are as in Formula I above and $R_4$ is selected from the group consisting of amino, lower alkoxy and acyloxy.

7. A process as defined in claim 3 wherein M in Formula IV above is an alkali metal and $R_5$ is acetyl.

8. A process as defined in claim 7 wherein $R_1$ is halogen, A is the

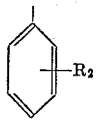

group or an α-pyridyl group and R, $R_2$ and $R_3$ are all hydrogen.

References Cited

UNITED STATES PATENTS 3,117,965   1/1964   Saucy et al. _____ 260—239.3

JOHN D. RANDOLPH, *Primary Examiner.*

WALTER A. MODANCE, *Examiner.*

ROBERT T. BOND, *Assistant Examiner.*

UNITED STATES PATENT OFFICE
CERTIFICATE OF CORRECTION

Patent No. 3,371,084                      February 27, 1968

Rodney Ian Fryer et al.

It is certified that error appears in the above identified patent and that said Letters Patent are hereby corrected as shown below:

Column 1, lines 47 to 54, the formula should appear as shown below:

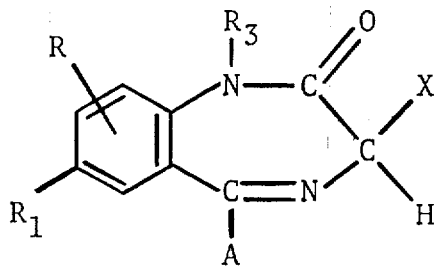

same column 1, lines 56 to 60, the right-hand formula should appear as shown below:

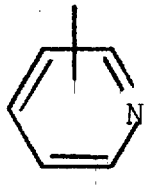

Signed and sealed this 3rd day of March 1970.

(SEAL)
Attest:

EDWARD M. FLETCHER, JR.              WILLIAM E. SCHUYLER, JR.
Attesting Officer                          Commissioner of Patents